Dec. 7, 1954  T. E. McDANIEL  2,696,402
DECKING FOR CATTLE TRUCKS AND TRAILERS
Filed March 24, 1951  2 Sheets-Sheet 1
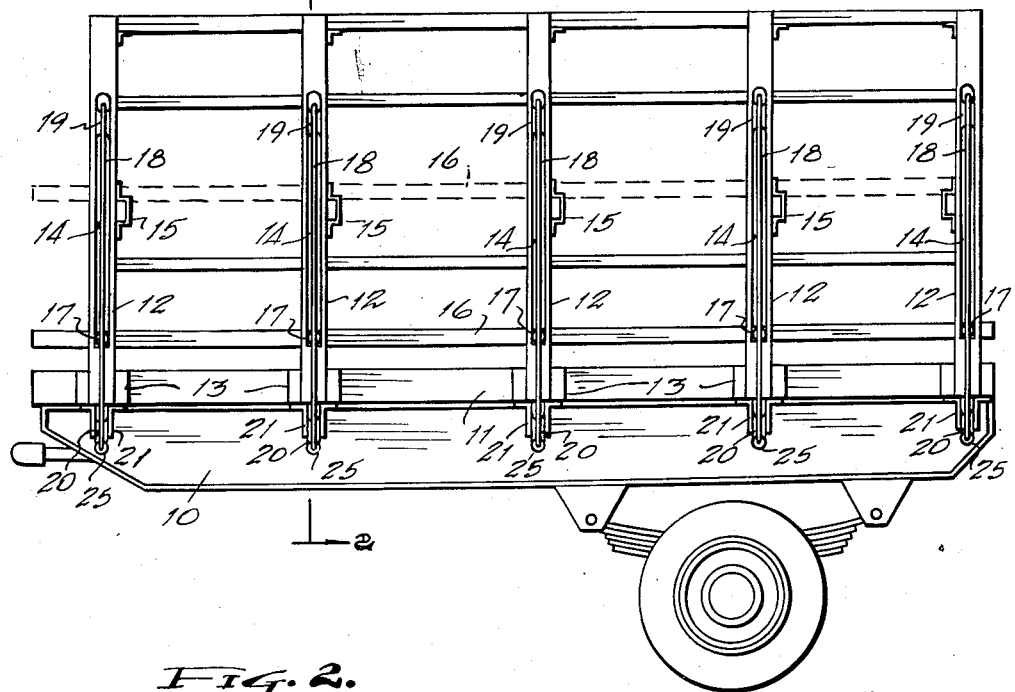
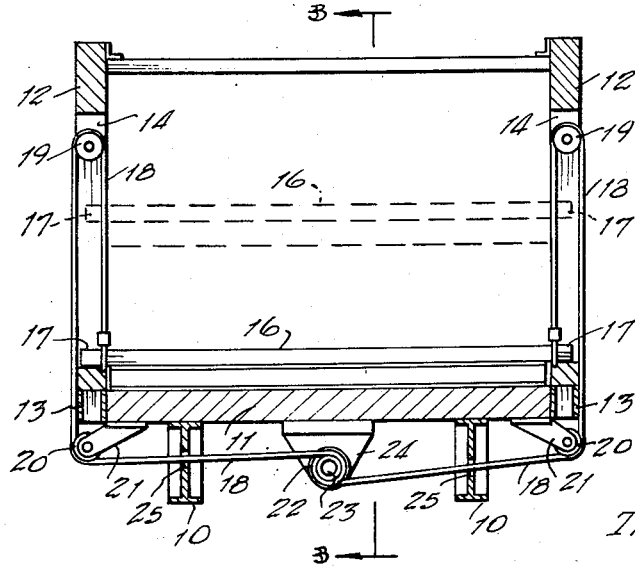
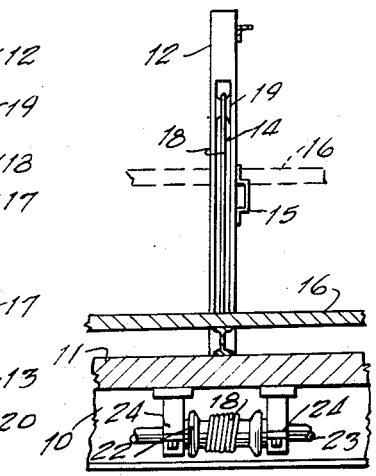
Thomas E. McDaniel
INVENTOR.
BY Cecil L. Wood
ATTORNEY Dec. 7, 1954 — T. E. McDANIEL — 2,696,402
DECKING FOR CATTLE TRUCKS AND TRAILERS
Filed March 24, 1951

Thomas E. McDaniel
INVENTOR.

BY Cecil L. Wood
ATTORNEY

United States Patent Office 2,696,402
Patented Dec. 7, 1954

2,696,402

DECKING FOR CATTLE TRUCKS AND TRAILERS

Thomas E. McDaniel, Brownwood, Tex.

Application March 24, 1951, Serial No. 217,346

2 Claims. (Cl. 296—12)

This invention relates to transportation equipment, and it has particular reference to improvements in adjustable decking for trailers and trucks for hauling livestock, and its principal object resides in the provision of semi-automatic apparatus for raising and lowering the upper decking in such vehicles where it is desirable to transport small animals, such as sheep, hogs, and the like, and affording a platform which may be carried on the vehicle at all times, even when in normal use for hauling cattle or horses, and readily adapted to be raised to a position which will provide an upper deck so that the vehicle can have double capacity when small animals are carried.

Another object of the invention resides in the provision of an arrangement of cables operating in the body stakes of the vehicle and operatively connected to the edges of the movable platform whereby the same can be elevated by the motor of the vehicle through the power take-off thereof, thus enabling the operator of the vehicle to perform the necessary adjustments from the vehicle cab and without the physical exertion required in adjusting the conventional decking ordinarily provided with such vehicles.

A still further object of the invention is that of providing a semi-automatic device by which loading and unloading operations can be both expedited and handled with greater economy than with the use of conventional equipment, and whereby small animals, such as sheep, goats, hogs, and the like, can be loaded, transported and unloaded with greater safety.

Broadly, the invention contemplates the provision of an elevated decking for livestock transporting equipment which is capable of being installed in conventional trucks or trailers designed for such transportation, and having semi-automatic means connected to the power unit of the vehicle whereby the decking can be adjusted with a minimum of effort on the part of the operator.

While the foregoing objects are paramount, other and lesser objects will become manifest as the description proceeds, taken in connection with the appended drawings wherein:

Figure 1 is a side elevational view of a trailer showing the invention installed thereon, and illustrating the decking, in dotted lines, in elevated position.

Figure 2 is a transverse sectional view of a trailer, on lines 2—2 of Figure 1, showing the invention installed thereon, including the cable assembly and operating winch, the decking being shown in dotted lines in raised position.

Figure 3 is a fragmentary cross-sectional view, on lines 3—3 of Figure 2, showing one of the stakes in which a cable is operated and showing the cable winch.

Figure 4:
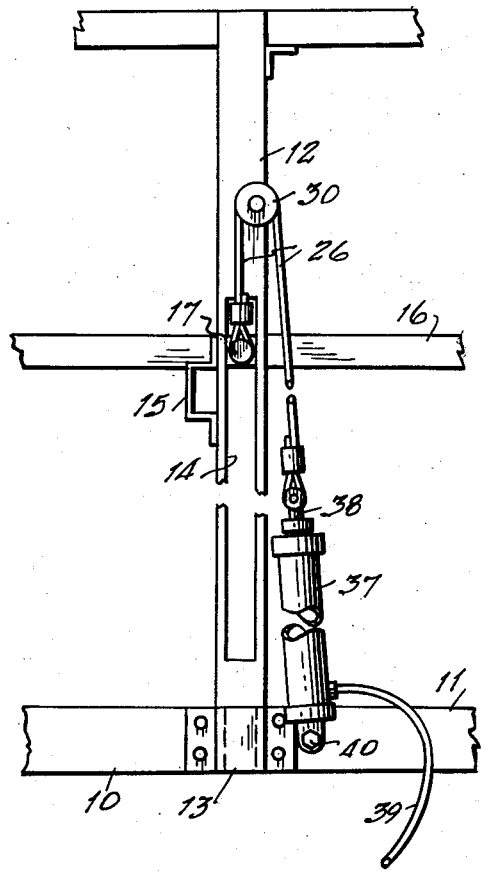
Figure 4 is a fragmentary elevational illustration showing one of the stakes in elevation, and illustrating a hydraulic device for operating the decking.

It is common practice among contract haulers of livestock to provide long, heavy trailers adapted to be coupled to a highway tractor, and having sideboards, supported by stakes, suitable for confining cattle and horses. There are generally provisions made to support upper decking on said sideboard stakes whereby to form upper and lower compartments to accommodate small animals, such as sheep, goats and hogs, and such conventional decking usually comprises a plurality of sections which must be manually lifted into the trailer and arranged on suitable supports for such purposes.

Livestock haulers are faced with the problem of being constantly equipped to transform their vehicles at any time from cattle or horse and mule hauling to accommodate smaller animals, particularly in areas where both sheep and cattle, and sometimes hogs, form a prominent part of the agricultural pattern, and it is the purpose of the invention to provide means for expediting the operations necessary to accomplish the transformations of equipment in the least amount of time and expended effort. It is also the purpose of the invention to afford equipment whereby the loading and unloading operations can be greatly expedited, therefore insuring greater economy in operating the vehicle.

The conventional type of livestock trailer, adapted to be coupled to an industrial or road tractor has a frame 10 which supports the floor 11 along each side of which is an arrangement of sideboard stakes or standards 12, the lower ends of which are extended into loops or sockets 13 secured to the edges of the floor 11 of the vehicle. Each of the standards 12 is formed with a longitudinal slot 14 whose purpose will presently become manifest.

As previously stated, the upper decking employed in such livestock trailers as here under consideration must be arranged in the vehicle by physical effort and supported on suitable brackets on the standards 12 or by cross-bars arranged transversely of the body of the trailer and supported at each end in loops 15 attached to the standards 12. It is not generally convenient to haul the upper decking on the trailer while transporting larger animals and, as a result, the decking must be left at some station requiring the operator of the vehicle to make extra trips to pick up the equipment when it is to be placed in service for transporting small animals, such as sheep, goats and hogs. It is frequently necessary or desirable to transport cattle, for example, in one direction, or to one station, and make a return trip with small animals, and obviously many more of the latter type animals can be hauled by double decking the vehicle.

The invention embodies a sub-platform or upper decking 16 of dimensions approximating those of the floor 11 of the trailer, as illustrated in Figures 1 and 2, and which is capable of being elevated by the motor of the tractor to which the trailer is coupled. The decking 16 has a series of spaced pins 17 arranged along each longitudinal side and these extend into the slots 14 of the standards 12 which guide the vertical movements of the platform 16 as the same is raised and lowered.

Cables 18 are connected at each end of the pins 17 and are arranged over pulleys 19 in the upper ends of the slots 14 which latter may, if desired, extend well above the normal position of the platform 16. The opposite ends of the cables 18, after the latter have been passed over the pulleys 19 in the standards 14, are passed over other pulleys 20 operatively supported in brackets 21 attached to the undersurface of the floor 11 of the vehicle, as shown in Figures 1 and 2, thence to spools or winches 22 mounted on a shaft 23 journalled in bearings 24 beneath the floor 11 of the vehicle and extending longitudinally of the trailer.

The shaft 23 is connected to and is rotatable by the power take-off (not shown) of the tractor. Each cable 18 extends through an aperture 25, a series of which are spaced along the frame members 10 of the vehicle, as shown in Figures 1 and 2. With this arrangement it is possible to operate the platform 16 upwardly and downwardly from the cab of the towing vehicle, as by operating the power take-off to reel or unreel the cables 18. After the platform 16 is elevated to its operative position cross bars can be arranged in the loops or keepers 15 on the standards 12 to support the member 16.

As apparent in Figures 1 to 3, the decking 16, when lowered, will function as a false floor for the vehicle upon which large animals can be loaded without departing from the conventional arrangement for such operations. By this arrangement, also, small animals can be loaded upon the platform 16 from a standard loading chute and the platform raised to its normal operative position to permit the loading of the lower deck or floor 11 of the vehicle. Conversely, in unloading the live cargo, the animals from the lower section may be driven out first and the platform 16 lowered so that the animals supported thereon can be unloaded on the same level.

It is apparent that such animals can be thus handled with greater safety since some operators are prone to force the animals out of the upper section from the decking 16 from which they are caused to jump to the ground, and some may suffer injury in so doing. It is not always possible nor desirable to afford loading chutes having different levels, or capable of adjustment to different levels, most such chutes being of a height equal to the standard floor level of the hauling vehicles.

Figure 5:
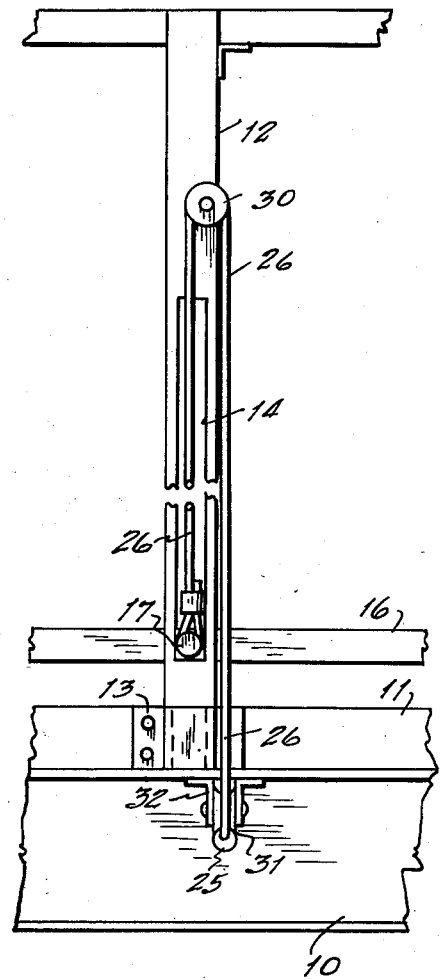
Figure 5 shows one of the body stakes in elevation, illustrating a modified arrangement of a cable therein connected to the decking.
Figure 6:
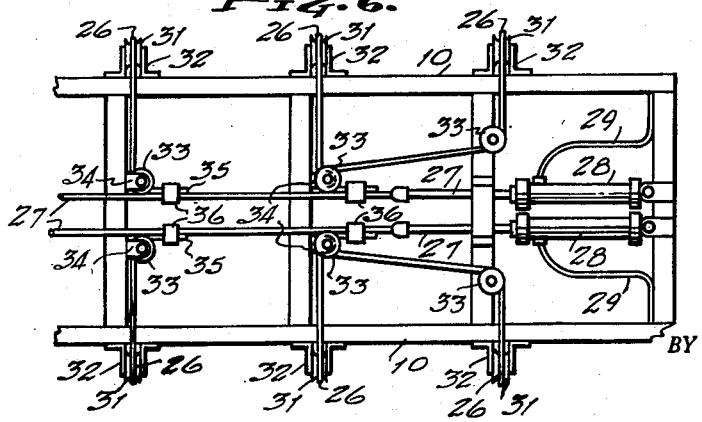
Figure 6 is a diagrammatic illustration of the frame of the vehicle showing an operative arrangement of cables connected to hydraulic mechanisms.

It is contemplated that the invention may be operated by hydraulic mechanisms, such as those illustrated in Figures 4, 5 and 6, in which cables 26 are employed and are operatively connected at one end to the plungers 27 of hydraulic pistons operating in cylinders 28 connected to the frame members of the vehicle, suitable conduits 29 being connected to a hydraulic pump on the vehicle. As shown in Figure 6 the cables 26, each of which is operatively arranged through the standards 12 over pulleys 30 therein, in the same manner as the cables 18 are operated in the structure shown in Figures 1 and 2. A plurality of pulleys 31, arranged in brackets 32 along the frame members 10, provide an arrangement similar to that also shown in Figures 1 and 2.

The cables 26, after being passed over the pulleys 30 and 31, operate over pulleys 33 on vertical pivots arranged in brackets 34 attached to the frame or undercarriage of the vehicle, as exemplified in Figure 6. The ends 35 of the cables 26 are secured by clamps 36, or other suitable device, to the plunger rods 27 of the hydraulic mechanisms previously described. The plunger rods 27 are arranged to operate in a horizontal plane longitudinally of the frame structure of the vehicle. In Figures 4 and 5 the pulleys 30 on the standards 12 are arranged on the outer face thereof and in a plane transverse to that in which the pulleys 19 of the structures illustrated in Figures 1 and 2.

A modified arrangement of the hydraulic mechanism is shown in Figure 4, each cable 26 being provided with a separate hydraulic cylinder 37 having a plunger 38 and a fluid conduit 39 connecting the cylinder 37 with the hydraulic pump on the vehicle and which is not illustrated. The cylinders 37 are pivotally connected by bolts 40, or the like, to the frame members 10 of the vehicle or along the sides of the floor 11 thereof.

It is intended that the scope of the invention be limited only by the prior art to which it appertains, and that certain changes and modifications in its structure may be resorted to by persons skilled in the art without departing from the spirit of the invention or the scope of the appended claims.

What is claimed is:

1. In a vertically adjustable upper deck for a livestock truck or trailer, in combination with the body of a vehicle having a floor and side boards enclosing the same, and a power operated means on said vehicle, a shaft arranged beneath the floor of said vehicle intermediate the sides thereof and having a driven connection with said power operated means, a series of stakes spaced along each side of said floor supporting said side boards, each of said stakes having a slot longitudinally thereof and having a pulley pivoted in the upper end thereof, a pulley pivoted in brackets at the lower end of each of said stakes aligned with the first named pulleys, a series of spools on said shaft aligned with the last named pulleys, cables reeled on said spools at one end and operating over the said pulleys aligned therewith, and a platform supported on the opposite ends of said cables above said floor and adapted to be raised and lowered by the rotation of said shaft.

2. In a truck and trailer decking for livestock adapted for operation to different levels, in combination with the body of a vehicle having a floor and side boards spaced along each side, and a power operated means on said vehicle, a shaft arranged beneath and longitudinally of said vehicle intermediate the sides thereof and having a driven connection with said power operated means, a series of spools spaced along said shaft, a pulley pivotally arranged at each end of each of said stakes and operatively aligned with said spools, a platform arranged between said side boards above said floor, and cables having one of their ends secured to the sides of said platform opposite each of said stakes and operating over said pulleys associated therewith, and having their opposite ends wound on said spools whereby said platform can be moved vertically by the rotation of said shaft.

References Cited in the file of this patent

UNITED STATES PATENTS

| Number | Name | Date |
|---|---|---|
| 214,432 | Miller | Apr. 15, 1879 |
| 357,535 | Ott et al. | Feb. 8, 1887 |
| 738,846 | Rich | Sept. 15, 1903 |
| 795,850 | Naughton | Aug. 1, 1905 |
| 896,466 | Ross | Aug. 18, 1908 |
| 1,229,374 | Youngblood | June 12, 1917 |
| 1,881,609 | Huwe | Oct. 11, 1932 |
| 2,129,438 | Nitsche | Sept. 6, 1938 |
| 2,561,927 | Janeczko | July 24, 1951 |
| 2,563,914 | Biszantz | Aug. 14, 1951 |
| 2,578,784 | Dath | Dec. 18, 1951 |